United States Patent Office 3,123,300
Patented Mar. 3, 1964

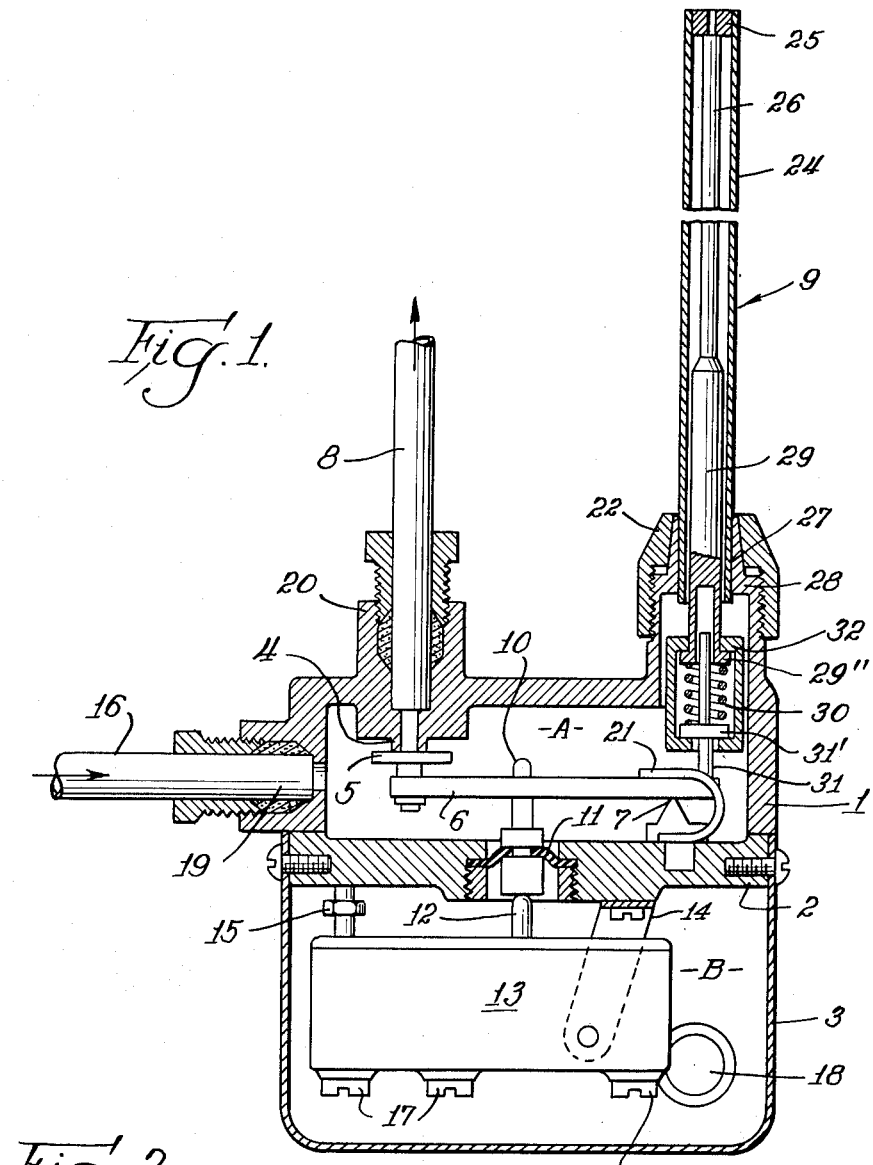

3,123,300
TEMPERATURE RESPONSIVE CONTROLLER
FOR GAS BURNERS
Heinz Goch, Dortmund-Wellinghofen, and Otto Suter, Osnabruck, Germany, assignors to G. Kromschroder, Aktiengesellschaft, Osnabruck, Germany
Filed Sept. 2, 1960, Ser. No. 53,796
Claims priority, application Germany Sept. 5, 1959
3 Claims. (Cl. 236—102)

The object of the invention is a temperature responsive controller which consists of a temperature sensing element extending with its adjusting member into a housing and of two instruments controlled by this, which are a gas valve mounted in the housing and an electric switch mounted outside the housing. Temperature responsive controllers of the known type have the drawback that the gas valve and the electric switch open simultaneously, because the acting direction and, accordingly, the axis of the adjusting members both of the temperature sensing element and also of the gas valve fall in a straight line. For reasons of safety, however, it is necessary that with the opening of the gas valve the current circuit not yet be interrupted, so that the gas flowing out will be certainly ignited on the electrically heated, glow-up heating and igniting member.

According to the invention this is achieved by an arrangement such that, the temperature sensing element, operating according to the principle of rod expansion, is coupled with the short arm, and the gas valve, and the gas valve as well as the switch are coupled with the long arm of a lever, in which arrangement the switch has a setting member establishing the dead center of the contact piece, for example, push rod. The temperature responsive controller according to the invention makes it possible, furthermore, to release the contact of the switch only from a certain temperature onward. Such a fine adjustment, however, was not possible with the liquid controlled temperature sensing elements of the known temperature responsive controller.

According to a further feature of the invention, the temperature sensing element and the gas valve are mounted on the one side of the lever and the switch, preferably a Microswitch, on the other. As a result, a compact construction is achieved of the temperature responsive controller grouped into a structural unit.

A further feature of the invention lies in the fact that an intermediate member serving as transmission member, conducted by a separating diaphragm clamped in or on the housing, is mounted between the lever and the contact piece or push rod of the switch. The design and mounting of the intermediate member of the type claimed is simple and has already proved itself in practice.

An example of execution of the temperature responsive controller according to the invention is represented in the drawing and is described in the following.

FIGURE 1 shows a section through the temperature responsive controller according to the invention in the heated state.

FIGURE 2 shows a detail of the temperature feeler belonging to the temperature controller, in the unheated state.

In FIGURE 1, 1 is an upper part of the casing, 2 a middle part of the casing and 3 a lower part of the casing of the temperature responsive controller. The casing parts 1 and 2 which are screwed (or bolted) together enclose a gas-filled space A. The space B underneath, in communication with the outside air, is bounded by the casing middle part 2 and the tub-like lower casing part 3. The space A, by way of a gas inlet 19 installed in the casing upper part 1, is in communication with the gas feed conduit 16, and, by way of a connecting piece 20, designed as a valve seat 4, likewise seated on the casing upper part 1, is in communication with the gas discharge conduit 8. A valve disk 5 associated with the valve seat 4 is mounted at the end of the long arm of a lever 6 which bears on a pivot edge 7 secured in the casing middle part 2. At the end of the short arm of lever 6 there engages a push rod 31 serving as adjusting member (passing through the casing upper part 1) of a temperature sensing element generally 9. Between the pivot edge 7 and the valve disk 5, the lever 6 is penetrated by an intermediate member 10. The other end of the intermediate member 10 projects into space B and acts there on a contact prong 12 of a Microswitch 13. The intermediate member 10 is mounted in a diaphragm 11 clamped in the casing middle part 2, tightly closing off the space A at this place. Microswitch 13 is mounted to swing in a yoke 14 secured on the casing middle part 2, and elevationally adjustable with respect to it by an adjusting screw 15 acting as adjusting member. Microswitch 13 has connecting terminals 17. A grommet 18 is placed in a wall of the casing lower part 3. A cable (not represented) leads from the connecting terminals 17 through the grommet 18 to a heating and igniting member (likewise not represented). The temperature sensing element generally 9, operating on the rod-expansion principle, is composed of a sensing tube 24 of high expansion coefficient, a base piece 25 closing the sensing tube 24 at one end, a sensing rod 26 (secured to base piece 25) within the tube 24, of low expansion coefficient, a rod 29 connected to sensing rod 26, the push rod 31 under the effect of a spring 30, and of a cap 32 supporting the rod 31 with respect to rod 29. The cap 32 is slidably received on rod 29 and abuts with its flanged end a collar 29" on the end of rod 29. The other end of cap 32 abuts disk 31' of push rod 31. The spring 30 is mounted between the disk 31' and the adjacent end of collar 29". The upper end of push rod 31 is received in a corresponding bore of rod 29, and the bottom end thereof bears on the short arm of lever 6. End 27 of tube 24 is threaded into a connecting piece 28 forming a part of the casing upper part 1. A cap 22 is screwed onto the connecting piece 28 and in the process presses the free end of connecting piece 28 sealingly against the sensing tube 24. A tension spring 21 fastened to the casing middle part 2 presses with its free end upon the long arm of lever 6, that is, in opening direction of gas valve 4, 5.

The temperature responsive controller is positioned so that the temperature sensing element 9 will survey a space that includes an electrically operated gas igniter (not shown). This igniter is operated by an electrical circuit that includes normally closed switch 13. When, for example, heat is called for by a thermostat, this circuit is closed by the thermostat (not shown) and the igniter commences to warm up. At this time of course the gas valve 4, 5 is closed by reason of the sensing element 9 pressing down on the short end of lever 6 to press valve disk 5 against valve seat 4.

FIGURE 1 shows the temperature responsive controller in its position after some heating of the sensing element 9 has occured and the sensing tube 24 has already lengthened so far that the spring 30, still under compression, brings the surrounding cap 32 into contact with the collar 29" of rod 29. In this position, as the drawing further shows, the push rod 31 rests on the short arm of lever 6 and, in this position, pushes so strongly on this, that the valve disk 5 barely still rests on its seat 4. If the temperature of the space surveyed by sensing element 9 rises further and the sensing tube 24 is consequently further expanded, then the valve 4, 5, opens, because the forces acting for the opening of the valve, engaging on the long lever arm (weight of the disk and of the long lever arm, reinforced by the force of tension spring 21) are greater than the forces acting for the closing of the valve 4, 5, proceeding onto the short lever arm from the push rod 31 (weight of the construction elements 29-32). The gas flowing in through the gas feed 16 and flowing out through the open valve 4, 5 into the gas discharge conduit 8 is ignited on the heating and igniting plate (not represented) which is connected in a circuit governed, at least in part, by the Microswitch 13. In the case of unheated space, the Microswitch 13 is closed, and the circuit governed by it is interrupted only after the valve 4, 5 is already opened and the temperature of the space surveyed is already raised by the burning gas to, say, 50° C. If the space surveyed now becomes cold, as, for example, when the flame goes out for lack of gas, then the sensing tube 24 contracts and, by way of the rod 29, presses the spring 30 and the push rod 31 onto the short arm of lever 6 in such a way that the valve disk 5 closes off the valve seat 4. On further cooling of the space, say, to outdoor temperature, the sensing tube 24 contracts still more; the excessive closing pressure resulting is taken up by the spring 30, which is additionally compressed, as is apparent in FIGURE 2. This end position of the temperature responsive controller is adjusted by corresponding insertion of the sensing tube 24 into the connecting piece 28. When the apparatus is set in operation, the space A fills with gas, but the valve 4, 5 remains closed. If now the main swtich of the circuit governed by the Microswitch 13 is closed, then the heating and igniting plate glows and warms the space surveyed by the temperature sensing element 9 in the above-described manner.

If the switching process that has been accomplished at the Microswitch 13 is not to be automatically canceled after reversal of the control movement, then, at switch 13, it is necessary also to provide a restoring pin (not represented) acting on the contact prong 12. The spring (likewise not represented) acting on the contact prong 12 is restored to the starting position by pressing in the restoring pin.

Invention is claimed as follows:

1. A temperature responsive safety cut-off valve and switch arrangement comprising a housing having gas inlet and outlet and a channel connecting said inlet and outlet, a tubular temperature-sensing element affixed to said housing at one end, an actuating rod arranged within said temperature-sensing element and affixed at one end to the free end of said temperature sensing element, lever means mounted in said housing, fulcrum means dividing said lever means into a first lever arm and a second lever arm, means for transmitting motion between said actuating rod and said first lever arm, a valve mounted in said channel between said inlet and said outlet comprised of a valve seat and a valve head cooperating therewith, said valve head being affixed to said second lever arm and so arranged that said valve is closed when said temperature-sensing element is in the contracted condition and said valve is open when said temperature sensing element is in the expanded condition, an electrical switch adjustably arranged and adapted to be connected in a circuit with an ignition element, means for transmitting movement of said second lever arm to actuate said switch, the arrangement being such that said switch is opened when said temperature-sensing element is caused to expand to the degree corresponding to a predetermined temperature, and means for adjusting the relative positions of said switch and said switch actuating means so that said switch is opened at the proper predetermined temperature.

2. A temperature valve and switch arrangement according to claim 1 wherein said temperature-sensing element and said gas valve are mounted at one side of said lever means, and said switch is mounted at the other side thereof.

3. A temperature valve and switch arrangement according to claim 1 wherein said means for transmitting movement from said second lever arm to said switch comprises a separating diaphragm affixed to said regulator housing and mounted between said second lever arm and the actuating portion of said switch.

References Cited in the file of this patent

UNITED STATES PATENTS

| | | |
|---|---|---|
| 969,848 | Davis | Sept. 13, 1910 |
| 2,033,336 | Hamilton | Mar. 10, 1936 |
| 2,099,643 | Werring | Nov. 16, 1937 |
| 2,463,712 | Newell | Mar. 8, 1949 |
| 2,667,217 | Caparone | Jan. 26, 1954 |
| 2,690,304 | Weber | Sept. 28, 1954 |
| 2,800,283 | Weber | July 23, 1957 |

FOREIGN PATENTS

| | | |
|---|---|---|
| 506,077 | Germany | Aug. 30, 1930 |